United States Patent [19]

Warner

[11] Patent Number: 5,435,597
[45] Date of Patent: Jul. 25, 1995

[54] COVER RETAINER ASSEMBLY FOR INFLATABLE RESTRAINT AIR BAG

[75] Inventor: Larry R. Warner, Livonia, Mich.

[73] Assignee: Ford Motor Company, Dearborn, Mich.

[21] Appl. No.: 294,221

[22] Filed: Aug. 22, 1994

Related U.S. Application Data

[62] Division of Ser. No. 102,921, Aug. 6, 1993, Pat. No. 5,378,013.

[51] Int. Cl.6 ............................ B60R 21/20
[52] U.S. Cl. ........................ 280/728.3; 280/728.2
[58] Field of Search ............ 280/728 B, 728 A, 731, 280/732, 728 R, 730 R; 292/87, 80, 67, 218, DIG. 16

[56] References Cited

U.S. PATENT DOCUMENTS

| | | |
|---|---|---|
| 842,304 | 1/1907 | Deming . |
| 1,564,183 | 12/1925 | Prinzler . |
| 3,104,903 | 9/1963 | Futch et al. . |
| 3,120,971 | 2/1964 | Bengtsson . |
| 3,618,995 | 11/1971 | McLean . |
| 3,888,508 | 6/1975 | Kizu et al. ............... 280/731 |
| 3,892,434 | 7/1975 | Caldwell . |
| 3,985,380 | 10/1976 | Raivio . |
| 4,216,984 | 8/1980 | Hofmann et al. . |
| 4,361,938 | 12/1982 | Emery . |
| 4,705,308 | 11/1987 | Bisbing . |
| 4,752,083 | 6/1988 | Honda ....................... 280/731 |
| 4,773,673 | 9/1988 | Sakurai ..................... 280/732 |
| 4,925,209 | 5/1990 | Sakurai ................... 280/728 B |
| 4,941,678 | 7/1990 | Lauritzen et al. ......... 280/732 |
| 4,989,897 | 2/1991 | Takada ..................... 280/732 |
| 5,005,880 | 4/1991 | Raine et al. . |
| 5,033,778 | 7/1991 | Niles et al. . |
| 5,058,919 | 10/1991 | Paquette et al. ......... 280/732 |
| 5,060,972 | 10/1991 | Satoh et al. ............... 280/732 |
| 5,064,217 | 11/1991 | Shiraki .................. 280/728 B |
| 5,066,037 | 11/1991 | Castrigno et al. ........ 280/732 |
| 5,074,584 | 12/1991 | Jarboe ...................... 280/731 |
| 5,096,221 | 3/1992 | Combs et al. ............ 280/732 |
| 5,135,252 | 8/1992 | Suran et al. .............. 280/732 |
| 5,172,932 | 12/1992 | Watanabe et al. ........ 280/731 |
| 5,199,739 | 4/1993 | Fujiwara et al. ......... 280/732 |
| 5,217,250 | 6/1993 | Sakata ...................... 280/731 |
| 5,217,253 | 6/1993 | Pray ......................... 280/732 |
| 5,294,147 | 3/1994 | Edge ..................... 280/728 B |
| 5,358,271 | 10/1994 | Watanabe et al. ...... 280/728 B |

FOREIGN PATENT DOCUMENTS

| | | |
|---|---|---|
| 2549932 | 5/1977 | Germany . |
| 3545028 | 7/1987 | Germany . |
| 4244558 | 7/1993 | Germany ................ 280/728 B |
| 650018 | 12/1962 | Italy . |
| 0193546 | 8/1991 | Japan .................... 280/728 B |
| 1320459 | 6/1973 | United Kingdom . |
| 2244961 | 12/1991 | United Kingdom . |

*Primary Examiner*—Karin L. Tyson
*Assistant Examiner*—Peter C. English
*Attorney, Agent, or Firm*—Daniel M. Stock; Roger L. May

[57] ABSTRACT

A cover retainer assembly for a support member having a cavity and an air bag disposed within the cavity includes a cover member closing the cavity and having at least first and second edges, a structure for fixedly securing the first edge of the cover member to the support member and a structure for releasably retaining the second edge of the cover member to the support member to allow the cover member to swing open toward the first edge upon deployment of the air bag.

9 Claims, 2 Drawing Sheets

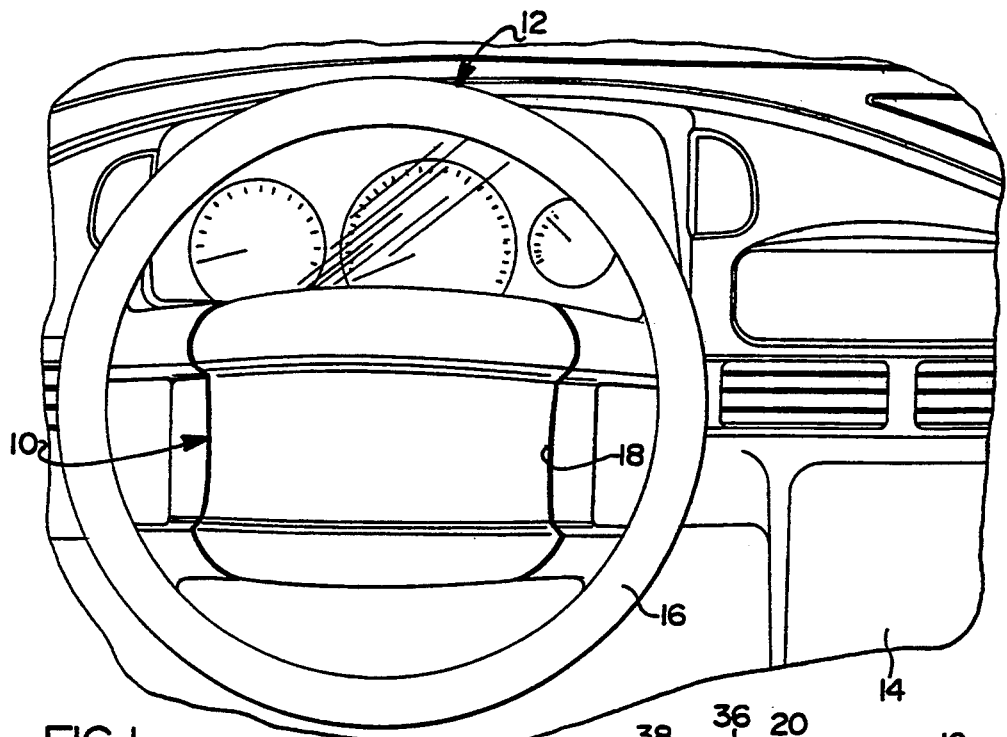
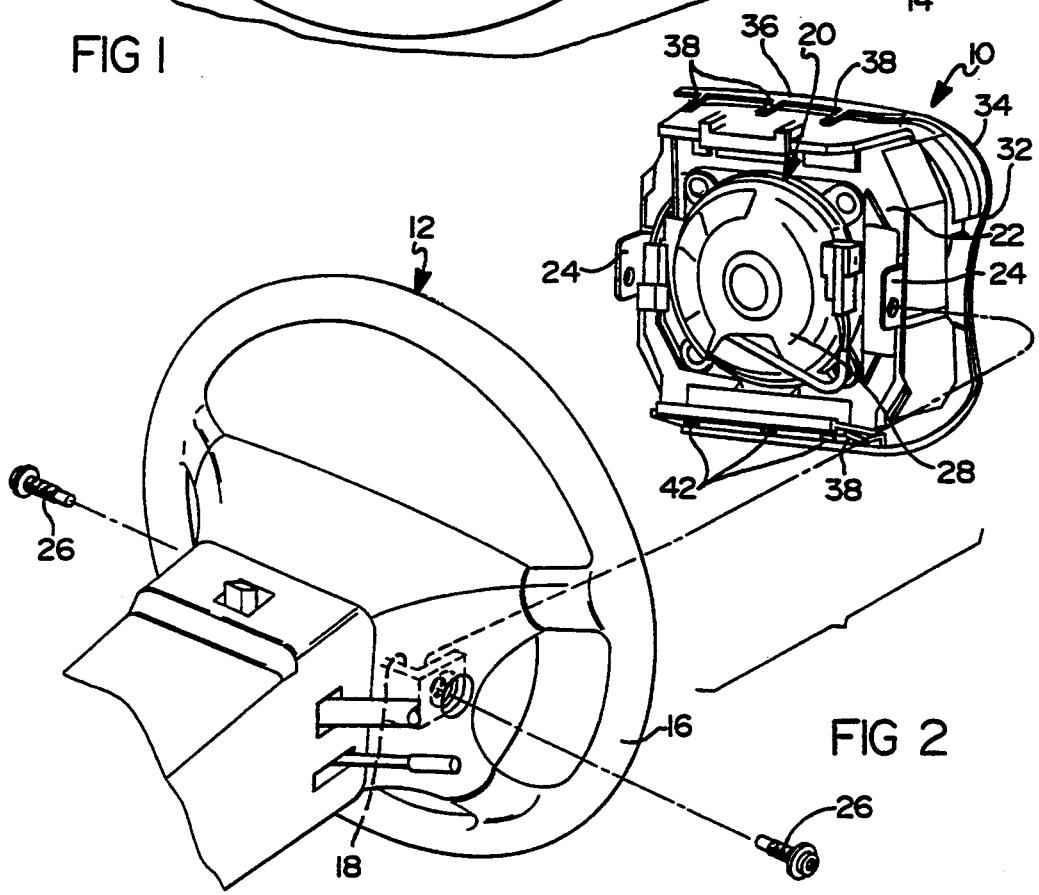

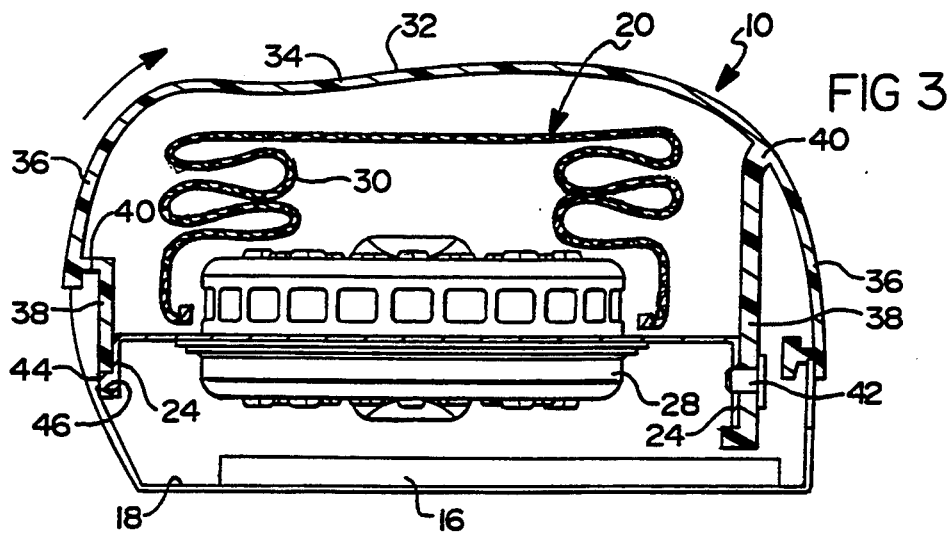
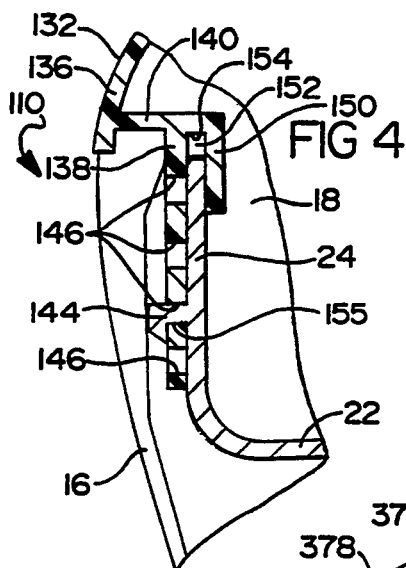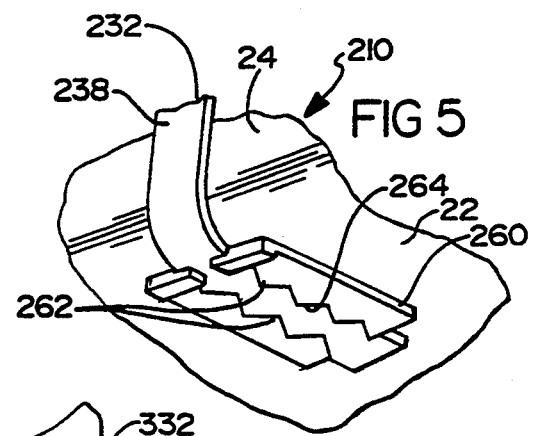
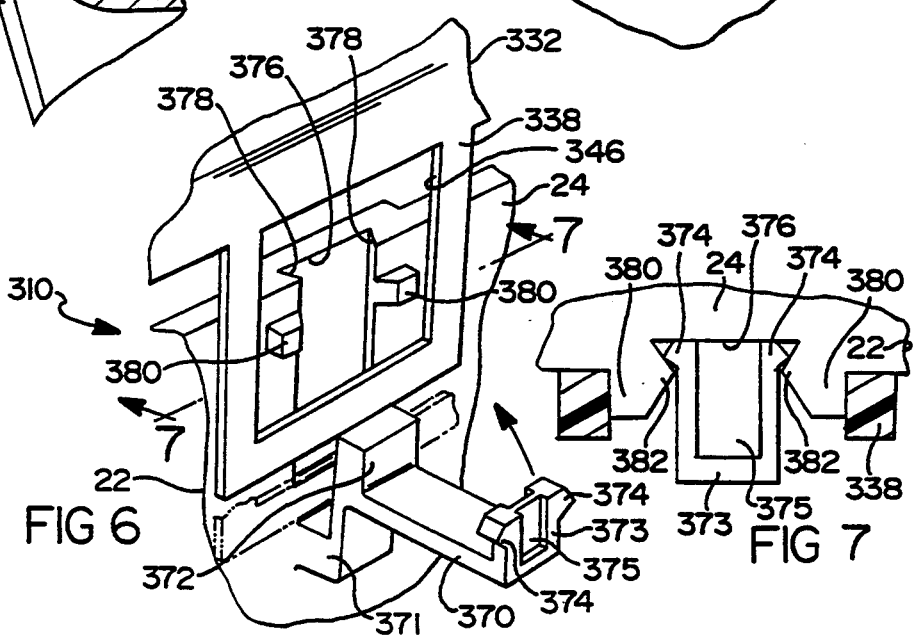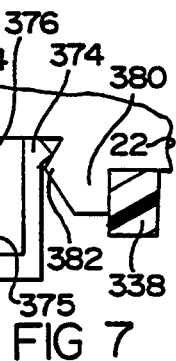

COVER RETAINER ASSEMBLY FOR INFLATABLE RESTRAINT AIR BAG

This is a divisional of U.S. patent application Ser. No. 08/102,921 filed Aug. 6, 1993, U.S. Pat. No. 5,378,013.

BACKGROUND OF THE INVENTION

1. Field of the Invention

The present invention relates generally to air bags for vehicles and, more specifically, to a cover retainer assembly for an inflatable restraint air bag of a vehicle.

2. Description of the Related Art

It is known that vehicles may collide with obstacles during operation. As a result, automotive vehicles have provided various structures to lessen the effects of a collision type impact on an occupant compartment of the vehicle. For example, some automotive vehicles may include an inflatable restraint air bag to lessen the effects of a collision type impact.

It is also known to incorporate an air bag into a steering wheel assembly of a vehicle to lessen the effects of a frontal collision type impact on an occupant compartment of the vehicle. For example, the steering wheel assembly may have a steering wheel cavity, an air bag disposed in the cavity and a cover member closing the cavity. The cover member is fixedly secured to the steering wheel assembly and may have a central perforation extending laterally across which tears or separates when the air bag is deployed to allow the air bag to inflate and expand into the occupant compartment.

While air bags provide an advantage in lessening the effects from a collision type impact, one design constraint is that the material for the cover member must have a rupture strength satisfactory for cover release of the air bag. Also, another design constraint is that the cover member must rupture quickly, thereby allowing high opening forces for the air bag upon deployment. A further design constraint is that attachment hardware and tool assembly are required to assemble the cover member to the steering wheel assembly.

SUMMARY OF THE INVENTION

Accordingly, the present invention is a cover retainer assembly for a support member having a cavity and an air bag disposed within the cavity. The cover retainer assembly includes a cover member closing the cavity and having at least first and second edges. The cover retainer assembly also includes means for fixedly securing the first edge of the cover member to the support member and means for releasably retaining the second edge of the cover member to the support member to allow the cover member to swing open toward the first edge upon deployment of the air bag.

One feature of the present invention is that a cover retainer assembly is provided for an inflatable restraint air bag. Another feature of the present invention is that the cover retainer assembly releasably retains a cover member to a steering wheel assembly. Yet another feature of the present invention is that no attachment hardware is required for the cover member. Still another feature of the present invention is that assembly time for the cover member is reduced. A further feature of the present invention is that opening forces for the air bag are minimized upon deployment of the air bag. A still further feature of the present invention is that the rupture strength of the material for the cover member as a factor for satisfactory cover release is minimized.

Other features and advantages of the present invention will be readily appreciated as the same becomes better understood after reading the subsequent description taken in light of the accompanying drawings.

BRIEF DESCRIPTION OF THE DRAWINGS

FIG. 1 is a front elevational view of a cover retainer assembly, according to the present invention, illustrated in operational relationship to a steering wheel assembly in an occupant compartment of a vehicle.

FIG. 2 is an exploded perspective view of the cover retainer assembly and steering wheel assembly of FIG. 1.

FIG. 3 is a fragmentary plan view of the cover retainer assembly and steering wheel assembly of FIGS. 1 and 2.

FIG. 4 is a partial plan view of a portion of a first alternate embodiment of the cover retainer assembly of FIGS. 1 through 3.

FIG. 5 is a partial perspective view of a portion of a second alternate embodiment of the cover retainer assembly of FIGS. 1 through 3.

FIG. 6 is a partial perspective view of a portion of a third alternate embodiment of the cover retainer assembly of FIGS. 1 through 3 in an unassembled state.

FIG. 7 is a sectional view taken along line 7—7 of FIG. 6 with the cover retainer assembly in an assembled state.

DESCRIPTION OF THE PREFERRED EMBODIMENT(S)

Turning now to the drawings and in particular to FIGS. 1 and 2 thereof, a cover retainer assembly 10, according to the present invention, is illustrated in operational relationship with a steering wheel assembly, generally indicated at 12, and an occupant compartment 14 of a vehicle such as an automotive vehicle (not shown). It should be appreciated that the steering wheel assembly 12 is moveable or rotatable and connected to the remaining structure of the vehicle as is known in the art.

The steering wheel assembly 12 includes a support member steering wheel 16 having a central steering wheel cavity 18. The steering wheel cavity 18 is generally rectangular in shape and has an opening facing into the occupant compartment 14.

Referring to FIGS. 1 through 3, the steering wheel assembly 12 also includes an air bag assembly, generally indicated at 20, disposed within the steering wheel cavity 18. The air bag assembly 20 includes a reaction member or plate 22 disposed within the steering wheel cavity 18 and having a pair of flanges 24 spaced laterally and secured to the steering wheel 16 by suitable means such as fasteners 26. The reaction plate 22 is made of a metal material although a suitable plastic material may be used. The air bag assembly 20 also includes an air bag inflator 28 secured to the reaction plate 22 by suitable means such as fasteners (not shown). The air bag assembly 20 further includes a gas or air bag 30 retained to the reaction plate 22 by suitable means such as a riveted ring (not shown). It should be appreciated that, upon a frontal collision type impact of the vehicle, the inflator 28 deploys gas into the air bag 30 to inflate the air bag 30.

The cover retainer assembly 10 controls deployment of the air bag 30. The cover retainer assembly 10 includes a cover member 32 to close the opening of the steering wheel cavity 18. The cover member 32 is generally rectangular in shape and has a base portion 34 and side portions 36 extending from the base portion 34 generally perpendicular thereto. The cover member 32 also has retention straps 38 connected to the side portions 36 by living hinges 40. The cover member 32 is made of a suitable material such as a relatively lightweight, soft, thin layer of cloth, vinyl, plastic, leather or a combination thereof.

The cover retainer assembly 10 also includes fasteners 42 such as rivets for fixedly securing one of the retention straps 38 to the reaction plate 22. The cover retainer assembly 10 further includes a projection 44 extending outwardly from a flange 24 of the reaction plate 22, opposite to the flange 24 to which the retention strap 38 is fixedly secured. The projection 44 may extend perpendicularly outwardly or at an angle. The projection 44 may also have an end flange (not shown) extending perpendicularly thereto at the free end thereof. The cover retainer assembly 10 also includes an aperture 46 which extends through the retention strap 38 to receive the projection 44. It should be appreciated that one of the retention straps 38 is fixedly hinged to the reaction plate 22 and at least an opposed retention strap 38 is releasably retained to the reaction plate 22. It should also be appreciated that the two other sides of the cover member 32 may have retention straps 38 releasably retained to the reaction plate 22.

In operation, one of the retention straps 38 is fixedly secured to the reaction plate 22 by the fasteners 42. The opposite retention strap 38 is pulled toward the reaction plate 22 to stretch the retention strap 38 such that the projection 44 is disposed through the aperture 46. When the inflator 28 is activated, the air bag 30 expands and presses outwardly on the cover member 32 until a predetermined force is achieved. At the predetermined force, the projection 44 ruptures and allows the cover member 32 to swing open or rotate toward the fixedly secured retention strap 38. As a result, the energy of the air bag 30 is managed and controlled to minimize the opening force of the air bag 30. Alternatively, the projection 44 may have a generally "V" shaped edge at the bottom thereof to cut the retention strap 38 as it stretches instead of rupturing the projection 44.

Referring to FIG. 4, a first alternate embodiment 110 of the cover retainer assembly 10 is shown. Like parts of the cover retainer assembly 10 have like reference numerals increased by one hundred (100). The cover retainer assembly 110 includes the retention strap 138, having a plurality of apertures 146 spaced longitudinally therealong. The cover retainer assembly 110 also includes an inner flange 150 spaced laterally from the retention strap 138 and connected to the side portion 136 by the living hinge 140. The cover retainer assembly 110 further includes a rib 152 disposed in a track 154 between the inner flange 150 and the retention strap 138 for a function to be described. Preferably, a plurality of ribs 152 are spaced along the track 154. The ribs 152 may be generally circular or rectangular in shape.

In operation of the cover retainer assembly 110, the cover member 132 is disposed over the opening of the steering wheel cavity 18 such that the flange 24 of the reaction plate 22 is disposed in the track 154 between the inner flange 150 and retention strap 138. One of the retention straps 138 is fixedly secured to the reaction plate 22 by the fasteners 42. The opposite retention strap 138 is moved toward the reaction plate 22 by pushing or compressing the cover member 132 toward the reaction plate 22. When this occurs, the ribs 152 engage the flange 24 until a predetermined force is achieved. At the predetermined force, the ribs 152 buckle or collapse to allow the projection 144 to be disposed in one of the apertures 146. When the inflator 28 is activated, the air bag 30 expands and presses outwardly on the cover member 132. As this occurs, a generally V shaped edge 155 on the projection 144 cuts or tears the retention strap 138 and allows the cover member 132 to swing open or rotate toward the fixedly secured retention strap 138.

Referring to FIG. 5, a second alternate embodiment 210 of the cover retainer assembly 10 is shown. Like parts of the cover retainer assembly 10 have like reference numerals increased by two hundred (200). The cover retainer assembly 210 has the retention strap 238 elongated with apertures eliminated. The cover retainer assembly 210 also includes a jaw member 260 molded integral to the reaction plate 22. The jaw member 260 has a plurality of teeth 262 spaced longitudinally and extending laterally inwardly on opposed sides to form a channel 264 for a function to be described. The retention strap 238 has a width greater than a width of the channel 264. It should be appreciated that the teeth 262 overlap the retention strap 238 when disposed in the channel 264.

In operation of the cover retainer assembly 210, one of the retention straps 238 is fixedly secured to the reaction plate 22 by the fasteners 42. The opposite retention strap 238 is pulled toward the jaw member 260 to stretch the retention strap 238 and cause the retention strap 238 to neck to a smaller width to fit into the channel 264. The retention strap 238 is disposed in the channel 264 and released. This release causes the retention strap 238 to expand and allows a portion of the teeth 262 to engage or bite the retention strap 238 to retain it in place. When the inflator 28 is activated, the air bag 30 expands and presses outwardly on the cover member 232. The pressure on the cover member 232 causes the retention strap 238 to stretch and neck down to a smaller width and disengages the teeth 262 to allow the cover member 232 to swing open or rotate toward the fixedly secured retention strap 238.

The retention strap 38,138,238 may be molded as an accordion of a flexible material which may be stretched to cooperate with either the projection 44, 144 or jaw member 260 without making a longer mold. The retention strap 38,138,238 also may be made to different lengths and the projection 44,144 or jaw member 260 may be located at various locations along the reaction plate 22 to obtain more or less stretch of the retention strap 38,138,238.

Referring to FIGS. 6 and 7, a third alternate embodiment 310 of the cover retainer assembly 10 is shown. Like parts of the cover retainer assembly 10 have like reference numerals increased by three hundred (300). The cover retainer assembly 310 includes a retention strap retainer 370 connected to the reaction plate 22 by a living hinge 371. The retention strap retainer 370 has a generally rectangular bale 372 extending outwardly perpendicularly near the living hinge 371 for a function to be described. The retention strap retainer 370 also has a flange member 373 extending outwardly and generally perpendicular at a free end thereof. The flange member 373 has a pair of locking tabs 374 spaced laterally by a flexible membrane 375 and extending outwardly for a function to be described.

The reaction plate 22 also has a groove 376 extending longitudinally in the flange 24. The groove 376 is generally rectangular in shape and has a pair of generally V-shaped recesses 378 extending laterally to receive the locking tabs 374. The reaction plate 22 also has a pair of laterally spaced projections 380 extending outwardly on opposed sides of the groove 376. The projections 380 have generally V-shaped inner edges 382 for a function to be described.

The retention strap 338 has a generally rectangular aperture 346 extending therethrough. The aperture 346 forms a generally U-shaped strap for a function to be described.

In operation of the cover retainer assembly 310, the cover member 332 is disposed adjacent the reaction plate 22. The retention strap retainer 370 is rotated or rocked toward the groove 376 by the living hinge 371 such that the bale 372 engages an end edge of the aperture 346. This engagement moves the cover member 332 toward the reaction plate 22 and pulls the retention strap 338 into tension. The locking tabs 374 engage the inner edges 382 of the projections 380 and are compressed inwardly as the membrane 375 flexes to dispose the locking tabs 374 in the groove 376. In the groove 376, the locking tabs 374 return to their original position such that the locking tabs 374 mate with the recesses 378 to form a snap-fit therein. It should be appreciated that the retention strap retainer 370 may be used in place of the fasteners 42. It should also be appreciated that the cover retainer assembly 310 provides serviceability by allowing removal and assembly with simple hand tools.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A cover retainer assembly for a support member having a cavity and an air bag disposed within the cavity comprising:
   a cover member closing the cavity and having at least first and second edges;
   means for fixedly securing said first edge of said cover member to the support member;
   a reaction member disposed within the cavity and secured to the support member; and
   a projection extending outwardly from said reaction member and having a generally V-shaped edge, said second edge of said cover member having at least one aperture extending therethrough to receive said projection to releasably retain said second edge of said cover member to the support member, said edge of said projection cutting said second edge to allow said cover member to swing open toward said first edge upon deployment of the air bag.

2. A cover retainer assembly as set forth in claim 1 wherein said cover member has a base portion and side portions extending from said base portion, said first and second edges being retention straps hingedly connected to said side portions.

3. A cover retainer assembly as set forth in claim 2 wherein said retention straps are made of a flexible material.

4. A cover retainer assembly as set forth in claim 1 wherein said fixedly securing means comprises fasteners.

5. A cover retainer assembly for a support member having a cavity and an air bag disposed within the cavity comprising:
   a cover member closing the cavity and having a base portion and side portions extending from said base portion and at least first and second edges, said first and second edges being retention straps hingedly connected to said side portions;
   means for fixedly securing said first edge of said cover member to the support member;
   a reaction member disposed within the cavity and secured to the support member, an inner flange spaced from said retention straps to form a track to receive a portion of said reaction member and a plurality of ribs disposed in said track and spaced therealong; and
   a projection extending outwardly from said reaction member, said second edge of said cover member having at least one aperture extending therethrough to receive said projection to releasably retain said second edge of said cover member to the support member to allow said cover member to swing open toward said first edge upon deployment of the air bag.

6. A cover retainer assembly for a support member having a cavity and an air bag disposed within the cavity comprising:
   a cover member closing the cavity and having at least first and second edges;
   means for fixedly securing said first edge of said cover member to the support member including a rotatable retention strap retainer attached to the support member and having locking tabs and a groove on the support member to receive said locking tabs;
   a reaction member disposed within the cavity and secured to the support member; and
   a projection extending outwardly from said reaction member, said second edge of said cover member having at least one aperture extending therethrough to receive said projection to releasably retain said second edge of said cover member to the support member to allow said cover member to swing open toward said first edge upon deployment of the air bag.

7. A cover retainer assembly comprising:
   a support member having a cavity;
   a reaction member disposed within said cavity and secured to said support member;
   an air bag disposed within said cavity and operatively connected to said reaction member;
   a cover member closing said cavity and having at least opposed first and second edges;
   means for fixedly securing said first edge of said cover member to said reaction member; and
   a projection extending outwardly from said reaction member and having a generally V-shaped edge, said second edge of said cover member having at least one aperture extending therethrough to receive said projection to releasably retain said second edge of said cover member to said reaction member, said edge of said projection cutting said second edge to allow said cover member to swing open toward said first edge upon deployment of said air bag.

8. A cover retainer assembly as set forth in claim 7 wherein said cover member has a base portion and side portions extending from said base portion, said first and second edges being retention straps hingedly connected to said side portions.

9. A cover retainer assembly comprising:

a support member having a cavity;

a reaction member disposed within the cavity and secured to said support member;

an air bag disposed within said cavity and operatively connected to said support member;

a cover member closing said cavity and having opposed first and second edges;

means for fixedly securing said first edge of said cover member to said reaction member; and an inner flange spaced from said second edge to form a track to receive a portion of said reaction member and a plurality of ribs disposed in said track and spaced therealong and means for releasably retaining said second edge of said cover member to said reaction member to allow said cover member to swing open toward said first edge upon deployment of said air bag.

* * * * *